United States Patent Office 3,702,127
Patented Nov. 7, 1972

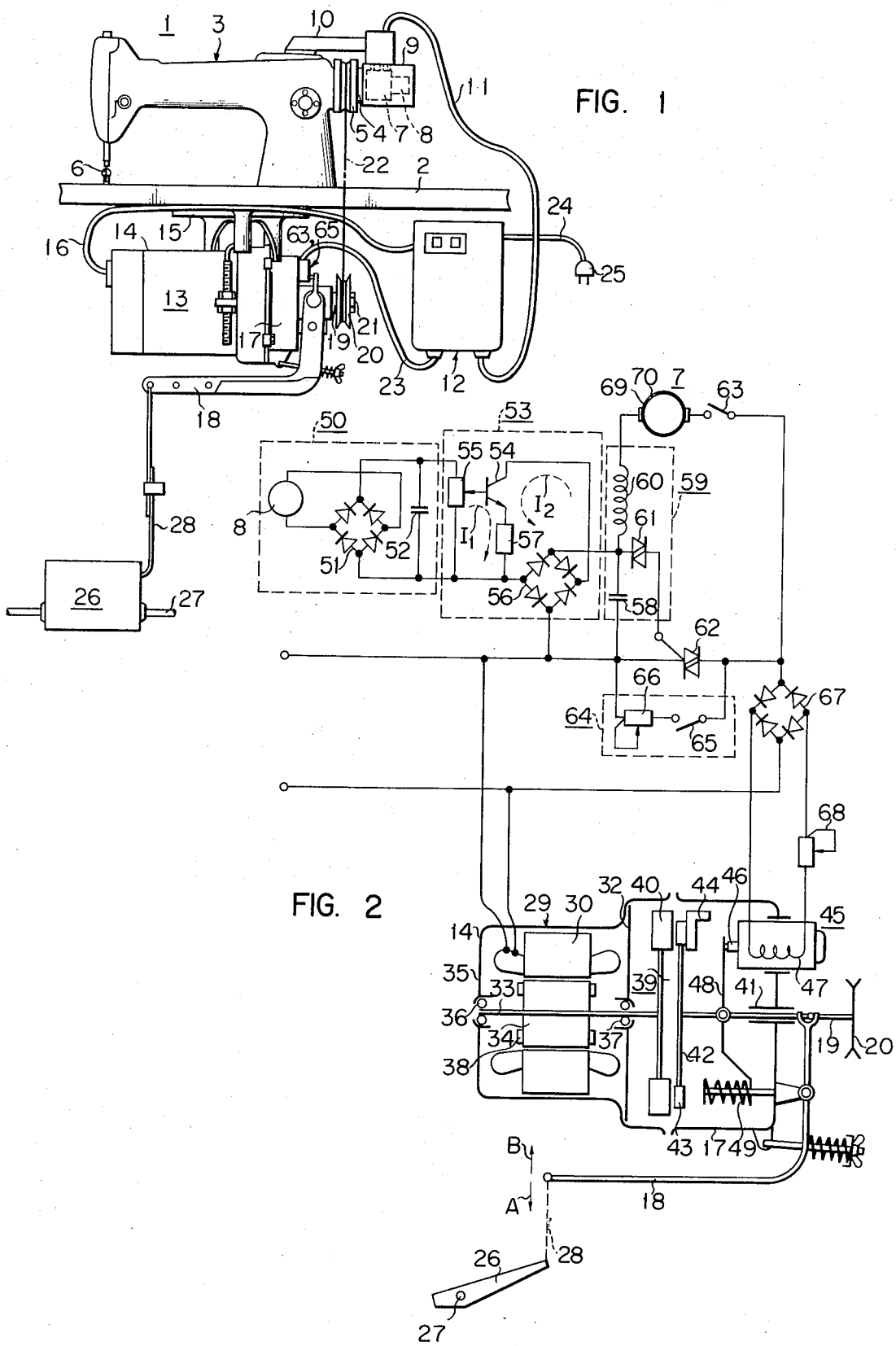

3,702,127
CLUTCH-BRAKE-MOTOR ASSEMBLY HAVING MECHANICAL AND ELECTROMAGNETIC ACTUATORS
Masahiro Yokoyama, Nagoya, Japan, assignor to Mitsubishi Denki Kabushiki Kaisha, Tokyo, Japan
Filed Sept. 15, 1970, Ser. No. 72,338
Claims priority, application Japan, Sept. 26, 1969, 44/76,714
Int. Cl. F16d 67/02
U.S. Cl. 192—18 B                                4 Claims

ABSTRACT OF THE DISCLOSURE

A clutch-brake-motor assembly comprises an electric motor having a rotary output shaft, a flywheel connected to the output shaft, a brake device positioned in spaced-apart relationship from the flywheel, a clutch plate alternatively movable into and out of engagement with the flywheel and the brake device, a rotary output member connected to the clutch plate and rotationally driven by the electric motor whenever the clutch plate engages with the flywheel, a biasing spring normally biasing the clutch plate into engagement with the brake device to brake the output member against rotational movement, and actuating means for selectively moving the clutch plate out of engagement with the brake device and into engagement with the flywheel. The actuating means comprises a mechanical system for initially overriding the biasing spring and starting movement of the clutch plate towards the flywheel and an electromagnetic system energizable in response to actuation of the mechanical system for electromagnetically continuing movement of the clutch plate towards the flywheel. The magnitude of the electromagnetic force almost equals and counteracts the magnitude of the biasing spring force and therefore only a small mechanical force is required once the electromagnetic system is energized.

BACKGROUND OF THE INVENTION

As well known to the art, a clutch motor is operated so that a load connected to an output shaft thereof is driven or stopped through the operation of a clutch lever or pedal by an operator. Therefore, if such a clutch motor is used as a driving device for such rotary machines as sewing machines, the operator might be obliged to effect several thousands of operation of the clutch lever or pedal in a day. Even a clutch operating work costs the operator considerable labor, which causes larger consumption of his physical strength.

SUMMARY OF THE INVENTION

It is accordingly a primary object of the invention to enable a machine operator to be assisted by an electromagnet device in his manually operating a clutch lever or pedal, whereby the clutch operating force required to be exerted by the operator is diminished.

It is another object of the invention to provide an apparatus for electromagnetically operating a clutch in a clutch motor, which is capable of automatically assisting a machine operator in his manually operating the clutch, in spite of its simple construction.

It is still another object of the invention to provide an apparatus for electromagnetically operating a clutch in a clutch motor, in which an electromagnet device used with a control mechanism for stopping a load at its fixed point is utilized as an electromagnet device for diminishing a force to be required to a machine operator when he manually operates a clutch lever or pedal, resulting in a smaller size of the clutch motor.

According to the invention, when the operator manually operates the clutch lever or pedal to allow a clutch plate to push against a flywheel to thereby transmit the rotation of the clutch motor through an output shaft, etc. to an arm shaft, the manually operated clutch lever causes a switch in a control circuit for an electromagnet device to be switched on, whereby the electromagnet device is energized and generates the force for the clutch plate to be moved toward the flywheel. Thus, the clutch plate is pushed against the flywheel due to the electromagnet device and the clutch lever besides, so that he is required only a less force for operating the clutch.

In the clutch motor with a fixed point stop mechanism for the sewing machine, such mechanism includes an electromagnet for controlling a coupling degree between the clutch plate and the flywheel to put the sewing machine in its low speed operation which is necessary for the fixed point stop purpose, as disclosed in U.S. patent application Ser. No. 828,844, filed May 29, 1969, by Masahiro Yokoyama et al. which application is assigned to the same assignee as the present invention. This invention preferably employs such an electromagnet for controlling the coupling degree as the aforementioned electromagnet device. Therefore, the invention can achieve its above and other objects without any additional electromagnet device.

BRIEF DESCRIPTION OF THE DRAWING

The invention will become more readily apparent from the following description taken in conjunction with the accompanying drawing in which:

FIG. 1 is a schematic front elevational view of a sewing machine embodying the principles of the invention; and FIG. 2 is a diagrammatic showing of an arrangement of control circuit elements or components embodying the invention together with the essential parts of the machine shown in FIG. 1.

Throughout a few figures like reference numerals designates the identical components.

DESCRIPTION OF THE PREFERRED EMBODIMENT

While the invention is applicable to a variety of clutch motors, it is particularly suitable for use with clutch motors employed in sewing machines and the description will now be made in conjunction with a clutch motor employed in a sewing machine. With such a clutch motor as employed in the sewing machine, in order to stop a sewing needle at its fixed point, a clutch is adapted to be operated by an energized electromagnet just before the stopping of the sewing machine.

Referring now to FIG. 1 of the drawing, it is seen that a sewing machine generally designated by the reference numeral 1 comprises a bed 2 on which an arm 3 including a root portion, a trunk portion and a head portion is disposed. An arm shaft 4 is rotatably disposed within the trunk portion and that end portion of the arm shaft 4 has a driven pulley 5 rigidly secured thereon such that upon rotation of the pulley 5 the arm shaft 4 drives a sewing needle 6 and a cloth feeding mechanism (not shown). A needle-position sensing means 7 is fixedly mounted on the arm shaft 4 and alternatively may be mounted on the pulley 5. A pilot generator 8 such as an AC tachometer generator is electrically connected to the position sensing means 7. The position sensing means and the generator 8 are contained within a common casing 9 which is supported to the arm 3 through a supporting and connecting member 10, and the position sensing means 7 and the generator 8 are electrically connected by a line cord 11 to an electric control panel 12 and are attached to the lower surface of the bed 2.

Under the bed 2, there is further provided a combined driving and controlling device 13 including a housing 14 provided on the upper portion with a mounting block 15 serving to connect the housing 14 to the lower surface of the bead 2. The combined driving and controlling device 13 is supplied thereto a source of AC voltage through the control panel 12 and a line cord 16. The housing 14 is provided on the righthand end with a bracket 17 within which a clutch mechanism comprising a limit switch for sensing an action of an electromagnet and a lever 18, etc. is accommodated as will be hereinafter described.

On an output shaft or clutch shaft 19, there is mounted a driving pulley 20 by a locking nut 21, which pulley is operatively coupled to the driven pulley 5 on the arm shaft 4 through an endless V-belt as designated at dot-and-dash line 22. The said electromagnet and the limit switch are electrically connected to the control panel 12 by a line card 23. The control panel 12 is also wired to a two-conductor line cord 24 which terminates in a plug 25 receivable in an ordinary electrical wall receptacle (not shown) for supplying the source of AC voltage. A foot actuated pedal 26 rotatably mounted on a shaft 27 is articulated through an adjustable connecting rod 28 to the lever 18.

As shown in FIG. 2, the combined driving and controlling device 13 comprises an electric motor 29 housed in the housing 14. The motor 29 includes a stator core 30 rigidly secured to the inner peripheral surface of the housing 14 and having a stator winding 31 inductively disposed on the core 30. The housing 14 is provided on the substantially intermediate portion with an intermediate bracket 32. Further, the motor 29 includes a motor shaft 33 having fixed thereto a motor core 34 and the rotor shaft 33 is rotatably carried by the lefthand integral bracket 35 and intermediate bracket 32 of the housing 14 through ball bearings 36 and 37. The rotor core 34 has a rotor winding 38 inductively disposed thereon.

The combined driving and controlling device 13 further includes a clutch means 39 axially aligned with the motor 29, as shown in FIG. 2. The clutch means 39 comprises a driving rotary block 40, having a large inertia mass (which is referred to hereinafter as the flywheel), rigidly mounted on the motor shaft 33 at the righthand end as viewed in FIG. 2. The housing 14 is closed at the righthand end with the bracket 17 which has integrally extending through the central portion a sleeve type bearing 41 whose longitudinal axis is aligned with that of the motor shaft 33. Rotatably carried by the bearing 41 is the aforementioned output shaft 19.

The output shaft 19 is provided on the lefthand end with a driven rotary block or a clutch plate 42 which is, in turn, provided on the outer peripheral edge portion with an annular friction disc 43 The clutch plate 42 is operatively associated with a brake block or shoe 44 of a braking device described hereinafter.

Electromagnetic means comprising a pair of electromagnet devices generally designated by the reference numeral 45 are fixedly secured to the bracket 17 is symmetric with respect to the output shaft 19, but for simplification only one electromagnet device 45 is shown. The electromagnet device 45 comprises a push rod 46 integrally connected to a movable iron core (not shown), and an exciting winding 47 inductively disposed around the iron core. The push rod 46 is operatively associated with a movable flanged annulus 48 mounted on the output shaft 19 so that upon excitation of the electromagnet device, the clutch plate 42 is moved leftward away from the brake block 44. Biasing means comprising a pair of resilient members, such as helical springs 49, are mounted on the flange portion of the annulus 48 in symmetry with respect to the output shaft 19 to normally bias the annulus 48 in the righthand direction to force the annulus 48 in the same direction. When the electromagnet device is deenergized, the resilience of the spring 49 causes the clutch plate 42 to be moved away from the flywheel 40 and to be pressed against the brake block 44 to thereby stop the rotation of the output shaft 19. The driving rotary block 40 is continuously rotating during operation of the motor 29.

In FIG. 2, there is shown a speed sensing circuit means 50 including the aforementioned tachometer generator 8 electrically connected across a pair of alternating current input terminals of a single-phase full-wave rectifier 51, and a capacitor 52 electrically connected across the other pair of direct current output terminals of the rectifier 51. In passing through the rectifier 51, an alternating current output of the generator 8 is converted into a direct current output and thereafter supplied to the capacitor 52 where it is smoothed. The smoothed output of the capacitor 52 is then supplied as an input to a speed regulating circuit means generally designated by the reference numeral 53.

The speed regulating circuit 53 includes a n-p-n transistor 54 and a variable resistor 55. The slide on the resistor 55 is connected to a base of the transistor 54 including a collector and an emitter connected across a single-phase full-wave rectifier 56. More specifically, the collector of the transistor 54 is directly connected to one of diametrically opposite terminals of the rectifier 56 and the emitter thereof is connected to the other terminal of the rectifier 56 through a resistor 57. Therefore, currents $I_1$ and $I_2$ flow respectively in directions, as designated at dot arrow, at a predetermined shunt rate from the base to the emitter of the transistor 54 and through a circuit traced from the collector, the emitter of the transistor 54, the resistor 57, and the rectifier 56. It will be apparent that the aforementioned shunt rate of $I_1$ and $I_2$ is determined by the resistor 52 and each magnitude of the currents $I_1$ and $I_2$ is in proportion to the number of rotations of the motor 29. In addition, the rectifier 56 includes another pair of diametrically opposite terminals connected across a capacitor 58 forming a part of firing circuit generally designated by the reference numeral 59.

The firing circuit 59 includes, in addition to the capacitor 58, a reactor 60 and a bidirectional triggering element 61 such as commercially available under the trademark "Diac." This firing circuit 59 renders a bidirectional three-terminal thyristor 62 such as commercially available under the trademark "Triac" to be fired on when the capacitor 58 has been charged to a predetermined magnitude of a voltage with the proper polarity.

A switch 63 (also shown in FIG. 1) cooperates with the lever 18 so that it is switched on when the connecting rod 28 moves in an upward direction B.

Generally designated by the reference numeral 64 is a control circuit by which the invention is characterized. The control circuit 64 comprises a switch 65 cooperating with the lever 18 so that it is switched on when the connecting rod 28 moves in a downward direction A, and a variable resistor 66. As shown in FIG. 2, the control circuit 64 is electrically connected in parallel with the bidirectional three-terminal thyristor 62. It will be readily understood that, instead of the abovementioned switches 63 and 65, a single switch with two terminals may be employed, effecting the same function.

The motor 29 is electrically connected across a pair of alternating current input terminals of a single-phase full-wave rectifier 67 through the bidirectional three-terminal thyristor 62 and the control circuit 64. The rectifier 67 has a pair of direct current output terminals electrically connected across the exciting winding 47 of the iron core through a variable resistor 68. The resistor 68 adjusts a flow of current through the exciting winding 47 to a suitable level.

The arrangement thus far described is operated as follows: When the plug 25 is received in the receptacle (not shown), the source of alternating current voltage is supplied through the conductors 24′, 24″ of the line cord 24 to the motor 29 thereby to drive the latter to continuously rotate the flywheel 40 approximately at its synchronous speed during the operation of the motor 29. Under such conditions, the foot actuated pedal 26 is depressed to mechanically pull the connecting rod 28 and the lever 18 in the downward direction A. This causes the clutch plate 42 to move into a clutching position wherein same is pressed against the flywheel 40 while at the same time the switch 63 is switched off in cooperation with the downward movement of the lever 18 to render the thyristor 62 non-conductive and the switch 65 is switched on to energize the electromagnet device 45 through the control circuit 64. As the result of the energization, the clutch plate 42 is further forced toward the flywheel 40 by the electromagnetic force and the force exerted by the operator besides.

As described hereinbefore, the biasing springs 49 are normally biased in the righthand direction to allow a braking torque to be applied to the output shaft 19 of sufficient strength to stop the rotation of the clutch plate 42. Therefore, when the operator wishes to push the clutch plate 42 against the flywheel 40 under satisfactory pressure, he is required to further depress the pedal 26 in the downward direction A by a force sufficient to overcome the resilience of the springs 49. This fact hastens operator's fatigue in the prior art devices particularly when he carries out several thousand or more such operations of the foot actuated pedal 26 in a day, resulting in a lower operation efficiency.

According to the invention, in order to diminish a clutch operating force required to the operator, the control circuit 64 is provided to allow the electromagnet device 45 to be operated in cooperation with the treading of the pedal 26 to utilize the electromagnetic force generated by the electromagnet devices 45. In ordinary operation of the sewing machine, this electromagnetic force can be controlled to have a magnitude somewhat less than the resilience of the spring force by adjusting the variable resistor 66.

In the preferred embodiment of the invention, although the electromagnet devices 45 and an electromagnet provided for the purpose of stopping the sewing needle at its fixed point are common, it is of course possible to provide the electromagnet device 45 for the exclusive purpose of diminishing the clutch operating force, independently of the electromagnet for the purpose of stopping the sewing needle at its fixed point.

When it is desired to apply the braking action to the rotating output shaft 19, the pedal 26 is released to move the lever 18 in the upward direction B. This permits the switch 65 to be switched off to deenergize the electromagnet device 45 while permitting the clutch plate 42 to be moved away from the flywheel 40 by the action of the biasing springs 40 until the clutch plate 42 is moved into a braking position wherein the friction disc 43 is forced to push against the brake block 44, whereupon the clutch shaft 19 is braked.

Further, simultaneously with the upward movement of the connecting rod 28, the switch 63 is switched on, whereby a circuit traced from the line conductor 24', the capacitor 58, the rector 60, the position sensing device 7, the switch 63, the alternating current input terminal of the rectifier 67, the exciting winding 47, the variable resistor 68, the direct current output terminal of the rectifier 67 and the line conductor 24" is completed.

Under such conditions, when the number of the rotation of the clutch shaft 19 is reduced to a predetermined low magnitude due to the breakage between the friction disc 43 and the brake block 44, the output voltage from the tachometer generator 8 also decreases to bring the transistor 54 into its conductivity region where the conductivity varies. That is, the transistor 54 increases in resistance between the collector and emitter thereof. This increase in resistance weakens the shunting action with respect to the capacitor 58 permitting the latter to be charged to a voltage sufficient to break down the triggering element 61. Thus, the bidirectional three-terminal thyristor 62 is fired on and the electromagnet device 45 is excited. This causes the clutch 42 to be moved away from the brake block 44 and to push against the flywheel 40. The thrust generated by the electromagnet device 45 is automatically controlled so that the arm shaft 4 rotates at a speed about the abovementioned predetermined speed. That is to say, the sustained rotation of the arm shaft 4 can be effected. In addition, the position sensing device 7 comprises, as shown in FIG. 2, a circular annulus or a slip ring 69 including a portion 70 of any suitable electrically insulating material such as mica. The slip ring 69 is fixed in electrically insulated relationship on the arm shaft 4. During the abovementioned sustained rotation of the arm shaft 4, the insulating portion 70 of the position sensing device 7 can contact with one of brushes (not shown) suitably supported in the casing 9. At that time, the insulating portion 70 provides a pause interval of time for the capacitor 58 sufficient to permit the exciting winding 47 to be fully deenergized. Thus, the breakdown of the triggering element 61 is not effected, and the thyristor 62 is fired off, and the winding 47 is deenergized to cause the clutch plate 42 to again push against the brake block 44 to be braked by the action of the springs 49, resulting in the stoppage of the arm shaft 4 in a desired angular position.

As previously described, according to the invention, it will be understood that since the electromagnet device 45 assists the sewing machine operator in manually clutching the clutch device, he can perform the sewing work without undue fatigue, and that the clutch operating electromagnet or an electromagnetic clutch forming an electromagnet and a clutch into a single unit is not only utilized to stop the sewing needle at its fixed point but also it is adapted to be operative even when its own control circuit is out of operation, i.e. at the starting and during operation of the sewing machine, resulting in no need of any special electromagnet.

What I claim is:

1. In combination: a rotatably mounted input member rotatable about a longitudinal axis; a movable clutch plate having a pair of friction surfaces thereon; an output member connected to said clutch plate for movement therewith; means mounting said clutch plate and output member for both rotary movement together about said longitudinal axis and translational movement together along said longitudinal axis between a clutching position wherein one of said friction surfaces on said clutch plate frictionally engages with said input member to effect rotation of said output member in response to rotational movement of said input member and a braking position; braking means coacting with the other of said friction surfaces on said clutch plate for braking rotational movement of said clutch plate when same is in said braking position; biasing means applying a continuous biasing force on said clutch plate to bias said clutch plate into said braking position; mechanical actuating means for mechanically applying a first force to said clutch plate to initially override said biasing force and start movement of said clutch plate from said braking position toward said clutching position; and electromagnetic actuating means responsive to actuation of said mechanical actuating means for electromagnetically applying a second force to said clutch plate supplementing said first force and coacting therewith to completely override said biasing force and continue movement of said clutch plate into said clutching position, said electromagnetic actuating means comprising a linkage system connected to said clutch plate to effect movement thereof along said longitudinal axis, at least one magnetic member mounted for movement in one direction to actuate said linkage system and apply said second force to said clutch plate to move same towards said clutching position and for movement in another direction opposite to said one direction, and electric circuit means responsive to actuation of said mechanical actuating means for creating a magnetic flux coacting with said magnetic member to move same in said one direction thereby applying said second force to said clutch plate.

2. A combination according to claim 1; wherein said electromagnetic actuating means includes means for developing said second force having a magnitude almost but not equal to said biasing force whereby said second force by itself is effective to substantially override said biasing force.

3. A combination according to claim 1; wherein said electric circuit means comprises a coil disposed in spaced-apart relationship around said magnetic member effective when energized to develop said magnetic flux, and a normally open electric circuit operative when closed to energize said coil and including a normally open switch movable into a closed position to thereby close said electric circuit in response to actuation of said mechanical actuating means.

4. A combination according to claim 1; wherein said mechanical actuating means includes a pivotally mounted lever manually actuatable to mechanically move said clutch plate along said longitudinal axis toward said clutching position.

References Cited

UNITED STATES PATENTS

| | | | |
|---|---|---|---|
| 2,920,221 | 1/1960 | Schwab | 192—18 B |
| 3,174,450 | 3/1965 | Becker et al. | 192—18 B |
| 3,312,319 | 4/1967 | Carrol et al. | 192—18 B |

BENJAMIN W. WYCHE, Primary Examiner

R. HEALD, Assistant Examiner

U.S. Cl. X.R.

192—12 D